(12) United States Patent
Velusamy

(10) Patent No.: US 12,271,659 B2
(45) Date of Patent: *Apr. 8, 2025

(54) ENHANCED VOICE USER INTERFACE EXPERIENCE VIA PREVIEW SERVICES ON AN EXTERNAL ASSISTANCE CHANNEL

(71) Applicant: T-Mobile USA, Inc., Bellevue, WA (US)

(72) Inventor: Senthil Kumar Mulluppadi Velusamy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,597

(22) Filed: Feb. 13, 2024

(65) Prior Publication Data
US 2024/0184518 A1     Jun. 6, 2024

Related U.S. Application Data

(63) Continuation of application No. 16/599,083, filed on Oct. 10, 2019, now Pat. No. 11,934,741.

(51) Int. Cl.
*G06F 3/16* (2006.01)
*G06Q 30/0601* (2023.01)
*G10L 15/26* (2006.01)

(52) U.S. Cl.
CPC ......... *G06F 3/167* (2013.01); *G06Q 30/0623* (2013.01); *G06Q 30/0643* (2013.01); *G10L 15/26* (2013.01)

(58) Field of Classification Search
CPC ............... G06F 3/167; G06Q 30/0623; G06Q 30/0643; G10L 15/26
See application file for complete search history.

(56) References Cited

U.S. PATENT DOCUMENTS

| 10,671,343 | B1 | 6/2020 | Kim |
| 11,934,741 | B2 | 3/2024 | Velusamy |
| 2009/0172546 | A1 | 7/2009 | Chang |
| 2013/0121261 | A1 | 5/2013 | Yao |
| 2015/0088514 | A1 | 3/2015 | Typrin |
| 2018/0285741 | A1 | 10/2018 | Marshall |

(Continued)

OTHER PUBLICATIONS

U.S. Appl. No. 16/599,083, Final Office Action mailed Feb. 14, 2023, 33 pages.

(Continued)

*Primary Examiner* — Angie Badawi

(57) ABSTRACT

A user interacts with a Voice User Interface (VUI) software application such as a digital assistant on a first user device such as a smart phone to access information about different products by communicating with a VUI server over a first communications channel. The VUI server relays indications of the products to an assistance server, for example a server in a wireless telecommunications network of a telecommunications service provider for the user device, and the assistance server provides additional information regarding the different products including images to the first user device and/or one or more additional user devices such as a smart television connected to the wireless telecommunications network user device via at least a second communications channel that is distinct from the first communications channel.

20 Claims, 3 Drawing Sheets

(56) References Cited

U.S. PATENT DOCUMENTS

2019/0172467 A1  6/2019  Kim

OTHER PUBLICATIONS

U.S. Appl. No. 16/599,083, Final Office Action mailed Nov. 19, 2021, 43 pages.
U.S. Appl. No. 16/599,083, Office Action mailed Aug. 10, 2022, 38 pages.
U.S. Appl. No. 16/599,083, Office Action mailed Jun. 21, 2021, 40 pages.
U.S. Appl. No. 16/599,083, Notice of Allowance mailed Nov. 22, 2024, 9 pages.

ENHANCED VOICE USER INTERFACE EXPERIENCE VIA PREVIEW SERVICES ON AN EXTERNAL ASSISTANCE CHANNEL

CROSS-REFERENCE TO RELATED APPLICATIONS

This application is a continuation of U.S. patent application Ser. No. 16/599,083 filed on Oct. 10, 2019, entitled "Enhanced Voice User Interface Experience Via Preview Services on an External Assistance Channel" by Senthil Kumar Mulluppadi Velusamy, which is incorporated herein by reference in its entirety for all purposes.

BACKGROUND

User devices or equipment such as computer tablets, wireless phones (e.g., smart phones) and the like that can be equipped with applications that include voice user interfaces (VUIs), such as digital assistants (e.g., Alexa™, Siri™, Cortana™, GoogleNow™, etc.). The user can interact with, receive information and services, and/or control the user device via the VUI. Applications that include VUIs on user devices such as digital assistants that can rely on remotely-located data and processing power to provide services and functionality to the user. For example, the remotely-located data and processing power can reside on a server that the user devices communicate with through a telecommunications service provider and/or the Internet.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

DETAILED DESCRIPTION

Figure 1:
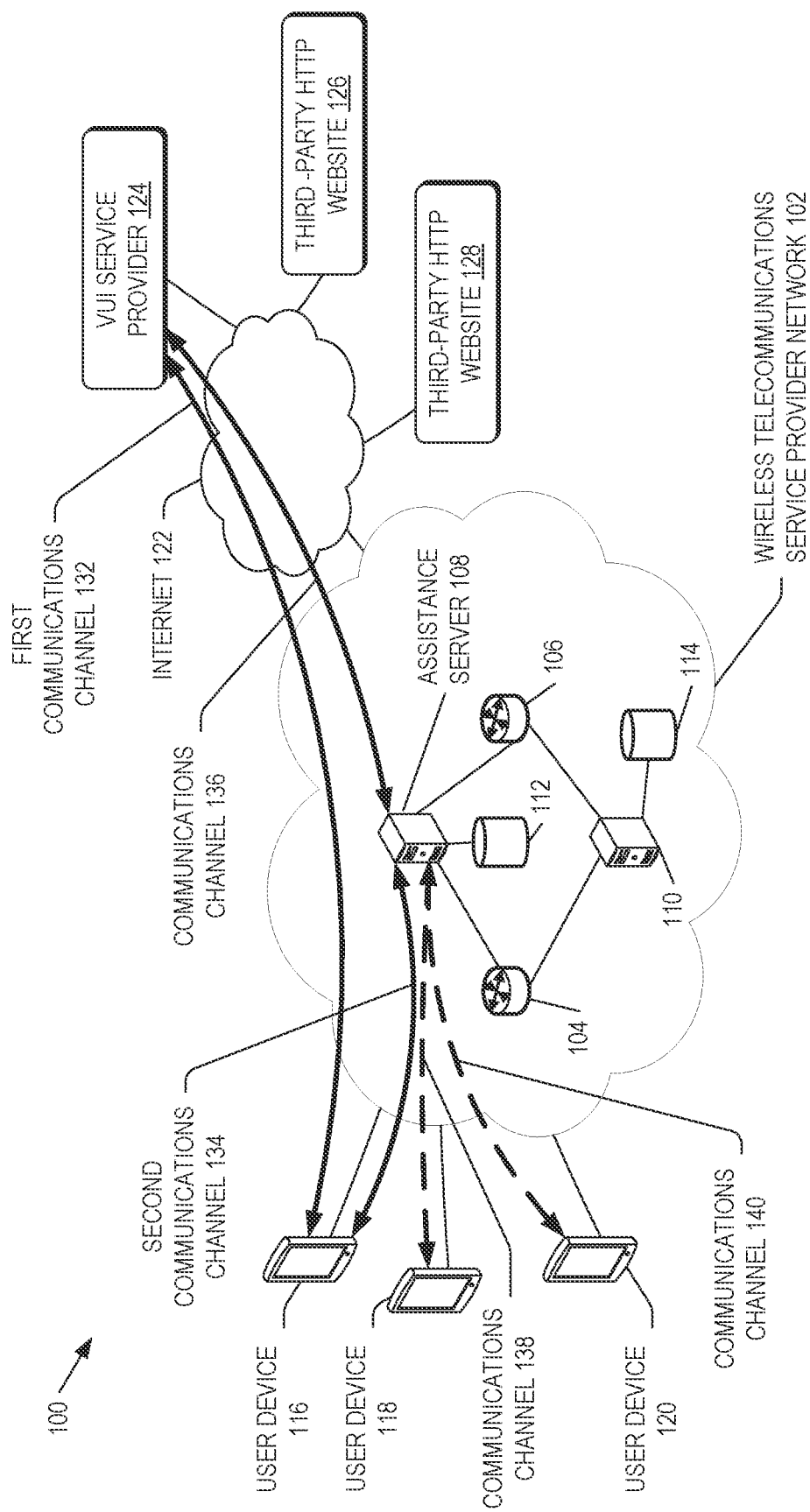
FIG. 1 shows an illustrative computing environment and network architecture for implementing techniques that enhance a user's VUI experience via external communications.

This disclosure is directed to improving a user's experience when engaging Voice User Interfaces (VUIs) and associated software applications or "apps" such as digital assistants like Amazon's Alexa™, Apple's Siri™, Microsoft's Cortana™, or Google's Google Now™, etc., to browse, shop for or decide upon objects such as products. Digital assistants with VUI capability can be useful to users to access services and identify objects that the user is interested in. However, when using the VUI via the user's device the user often has insufficient visual reference images for the objects or products that the digital assistant has identified for the user's consideration. A solution in accordance with various embodiments described herein includes establishing an additional, separate communications channel different from the VUI communications channel to provide the user with images and optionally additional information relating to the objects referenced in the VUI communications channel. This can conserve bandwidth on the VUI channel and provide an enhanced experience for the user to access and view the images and additional information.

In example embodiments, the VUI communications channel is a communications channel between an app such as a digital assistant on the user's device (e.g., a smart phone), and a remotely-located server (referred to herein as a "VUI server") that provides processing power and data to support interactions between the user and the digital assistant, and the VUI server. The VUI communications channel or link can go through a wireless telecommunications service provider network of a telecommunications service provider with which the user has a subscriber or customer account, and/or through the Internet and/or other subnetworks such as Wi-Fi networks. The VUI server can, for example, receive and analyze the user's speech commands provided through the VUI interface of the app, determine meanings or likely meanings of the user's speech, and respond accordingly by gathering and selecting information to provide to the user via the VUI communications channel. In accordance with embodiments described herein, the VUI server can also communicate with other third-party websites or entities to obtain information to provide back through the VUI communications channel. The VUI server can also provide information regarding the user and the user's activities as evident through the user's device, to third-party websites or entities for various reasons and in accordance with privacy policies and settings approved by the user.

In particular and in accordance with example embodiments, the VUI server communicates with the user's telecommunications service provider (e.g., with a wireless telecommunications service provider network belonging to the user's telecommunications service provider) to indicate what the user is interested in, for example the objects that the digital assistant has identified for the user. In response, the telecommunications service provider locates images and, optionally, additional information relating to the objects of the user's interest and provides them to the user in a coordinated fashion via a separate communications channel, that is different from the VUI communications channel. In example embodiments the separate communications channel is a communications channel between a server (referred to herein as an "assistance server") in the wireless telecommunications service provider network and a second app on the user's smart phone, and/or between the assistance server and one or more other devices belonging to the user or associated with the user's subscriber account with the telecommunications service provider that the user can see, for example a television, and/or a tablet computer. If the assistance server doesn't have images and/or additional information relating to the objects of the user's interest as communicated by the VUI server, then the assistance server can reach out to third party entities such as websites on the Internet, to access and gather images and/or additional information to provide to the user and her respective device(s) via the separate communications channel.

FIG. 1 shows an illustrative computing environment 100 and network architecture for implementing techniques that enhance a user's VUI experience via external communications, by providing additional information including images to one or more devices of the user via a second communications channel that is different from a VUI communications channel that the user is using via a user device and a VUI app on the user's device to identify objects of interest to the user.

In particular, in accordance with example embodiments FIG. 1 shows a wireless telecommunications service provider network 102 owned and administered by a telecommunications service provider with which the user has a customer or subscriber account. The wireless telecommunications service provider network 102 is in communication with the user's user device 116 which has a VUI app, such as a digital assistant, that the user can use to access services and identify objects of interest to the user. The VUI app on the user device 116 connects with a VUI server or service provider 124 via a VUI communications channel shown in FIG. 1 as a first communications channel 132 that passes through the wireless telecommunications service provider network 102 and the Internet 122, extending between the user device 116 and the VUI service provider 124. The VUI service provider 124 communicates with an assistance server 108 in the wireless telecommunications service provider network 102, for example through the Internet 122 via a communications channel 136, and indicates objects that the user is interested in and for which the user has requested images and/or additional information, or is likely to appreciate images and optionally additional information that for one or more various reasons should come to the user via a different communications channel than the first communications channel 132. These reasons can include, for example, bandwidth issues or scarcity on the first communications channel 132, constrained resources at the VUI service provider 124, limited screen and/or other technical capability on the user device 116, an inability or difficulty on the part of the VUI service provider 124 to obtain images and/or additional information relating to the objects that the VUI app has identified as of interest to the user, and other factors.

In example embodiments, the VUI service provider 124 receives an explicit indication from the user via the digital assistant, that the user is interested in one or more particular products, and would like images and/or additional information provided via a different channel than the first communications channel 132. In other embodiments, the VUI service provider 124 can infer from the user's interactions with the digital assistant that the user is likely to desire images and/or additional information regarding specific products via a different communications channel, and can proactively act upon that inference by inquiring with the user for confirmation or presenting an option to activate a different communications channel, or can simply proceed on a basis as if the user had explicitly indicated a desire to receive images and/or additional information on the separate communications channel, based for example on the user's preferences and/or prior history. In example embodiments the VUI service provider 124 and the telecommunications service provider have a pre-existing arrangement whereby, with permissions and selections from the user, the VUI service provider 124 provides options or capabilities for the user to request images and/or additional product information through a VUI digital assistant app on the user's device, for delivery to the user's device(s) via a separate communications channel with the wireless telecommunications service provider network 102. In example embodiments the user can instruct the VUI service provider 124 through the VUI digital assistant on the user's device to initiate contact with the wireless telecommunications service provider network 102 to establish the second communications channel 134 (and possible additional or alternative communications channels 138, 140 that will be addressed in further detail below). In example embodiments this involves exchanging or verifying user credentials/identity, telecommunications service provider credentials, VUI service provider credentials, an eligibility of the user consistent with the user's subscriber agreement with the telecommunications service provider, and the like to activate the second communications channel 134 in accordance with an existing agreement or arrangement, or to arrange or establish the second communications channel 134 and corresponding services for the first time on a temporary basis or on an ongoing basis or for specific durations of time or specific amounts of data per agreements between two or more of the VUI service provider, the telecommunication service provider, and the user.

In response to information from the VUI service provider 124 regarding the user's VUI communications (e.g., objects identified as of interest to the user), the assistance server 108 gathers images and optionally additional information to provide to the user, and then conveys them to the user device 116 via the second communications channel 134 for presentation to the user. In example embodiments and as described in greater detail elsewhere herein, the images and/or additional information are additionally or alternatively provided to the user devices 118, 120 via the communications channels 138, 140 respectively. On the user device 116 the images and/or additional information can be displayed to the user via an app that is different from the VUI app (e.g., a digital assistant app) that is communicating through the first communications channel 132. In example embodiments, the second communications channel 134 and/or one or more of the communications channels 138, 140 can variously include one or more of email communications, Short Message Service (SMS) messaging, data communications, app-to-app communications, app-to-server communications, server-to-app communications or any other communication method, mechanism or protocol that conveys images and additional information regarding the objects of interest to the user, for presentation to the user on those devices. In example embodiments, the user can select one or more of these types of communication to receive the image and/or additional object or product information, for example by preference settings and/or by responding to alerts or prompts from one or both of the VUI service provider 124 or the assistance server 108, or by explicitly and proactively requesting a particular type of communication (e.g., via a VUI of a digital assistant on the user device 116).

In an example embodiment, the assistance server 108 first accesses information within the wireless telecommunications service provider network 102 to gather the images and additional information regarding objects that the VUI service provider 124 indicated the user is interested in, for example by checking data stores 112, 114 inside the wireless telecommunications service provider network 102. If the assistance server 108 doesn't find information it is looking for inside the network 102, then it seeks that information from external sources, for example by accessing third-party servers or websites such as the third-party HTTP (hypertext-transfer protocol) websites 126, 128 via the Internet 122 as shown in FIG. 1. In other example embodiments, the assistance server 108 can access information sources external to the wireless telecommunications service provider network 102 either before, or simultaneously with, accessing data stores within the network 102. After the assistance server 108 gathers the images and additional information regarding objects that the VUI service provider 124 indicated the user is interested in, the assistance server 108 provides the images and optionally the additional information to the user device 116 via a second communications channel 134 between the assistance server 108 and the user device 116, for display to the user on the user device 116. In example embodiments, the images and/or the additional information are provided additionally or alternatively to other devices associated with the user, for example the user devices 118, 120 shown in FIG. 1. These other devices can be, for example, devices other than smart phones, for example a tablet computer or a larger display such as a smart television that is connected to the wireless telecommunication service provider network 102 and has sufficient computing capability to receive images and information from the network 102 and display them. In example embodiments where the images and/or the additional data are provided to other user devices than the user device 116, the assistance server 108 can send an alert for display on the user device 116 to alert the user that the assistance server 108 is sending the images and/or additional information to other user devices known to the network 102 that belong to the user and/or are associated with the user's account or subscription with the telecommunications service provider. The alert can indicate specifically which user devices, and in example embodiments can provide the user opportunity to first select specifically which user device or devices (e.g., one or more of the user devices 116, 118, 120) should receive the images and/or information, or to change a default selection of user devices that will receive the images and/or additional information. Where the images and/or additional information are divided into subsets or arranged in groups, in an example embodiment the user can interact with the assistance server 108 through the user device 116, to designate which other user device should receive which subset or group—for example, images to the user device 118 via a communications channel 138, and additional information to the user device 120 via a communications channel 140. In an example embodiment, one or more of the user devices 118, 120 may belong to other persons besides the user, either on a same subscriber account as the user (e.g., a family member) or on a different subscriber account known to the wireless telecommunication service provider network 102 and having permissions set up to receive information in this way on behalf of the user and the other person. This could be useful for confirming a possible purchase with a family member or business partner, for example. In an example embodiment, the alert from the assistance server 108 to the user via the user device 116 can indicate which user devices the network 102 can see and communicate with, so that the user can select among them via the user device 116 to variously receive some or all of the image and/or additional information.

A specific scenario can involve, for example, a user shopping or browsing a web store of the telecommunications service provider via a VUI of a digital assistant for a new smart phone and selecting several different colors and options combinations of a new smart phone model for preview. In this instance the web store can be located on a website such as the third-party HTTP website 126 or can be located on a server resource within the wireless telecommunications service provider network 102, such as the server 110 shown in FIG. 1. In either case, the VUI service provider 124 communicates with the server 110 or the third-party HTTP website 126 via the Internet 122 to get basic information regarding the smart phone model to relay back to the user device 116 via the first communications channel 132. In example embodiments, basic information generally doesn't include detailed specifications regarding the smart phone, for example that might be better presented visually, in chart form rather than via voice, and/or images of the smart phone, for example higher resolution images and/or images with true color or other aesthetic representations such as a three-dimensional, rotatable model that would be better provided over the second communications channel. The VUI service provider 124 also provides information identifying the user and the smart phone model that the user is interested in to the assistance server 108 via the communications channel 136. In example embodiments the VUI service provider 124 also optionally identifies information sources for images and/or additional information regarding the smart phone (or other device or object the user is interested in) and provides those sources to the assistance server 108. The assistance server 108 then communicates with the internal server 110 within the wireless telecommunications service provider network 102, or with the third-party HTTP website 126 via the Internet 122 (as the case may be) to obtain images and optionally additional information regarding the new cell phone model that the assistance server 108 can then communicate to the user device 116 via the second communications channel 134 (and/or the user devices 118, 120 via the communications channels 138, 140 respectively), consistent with embodiments variously described herein. In this way the user can see options and configurations of the new model cell phone and make a selection for purchase.

In example embodiments, the third-party HTTP websites 126, 128 are variously one or more of manufacturers of objects identified by the VUI service provider 124 as of interest to the user, such as cell phone manufacturers, tablet manufacturers and so forth, websites hosting product reviews, merchants selling the objects, or any other source of information regarding the objects that would be of use to the assistance server 108 in providing images and additional object or product information to the user, for example via one or more of the user devices 116, 118, 120.

The routers 104, 106 shown in FIG. 1 within the wireless telecommunications service provider network 102 in example embodiments support communications between the servers 108, 110 within the network 102, and also variously support communications between the user devices 116, 118, 120 with the network 102 and communications between the network 102 and the Internet 122 directly and the VUI service provider 124, and third-party websites 126, 128 indirectly through the Internet 122.

Figure 2:
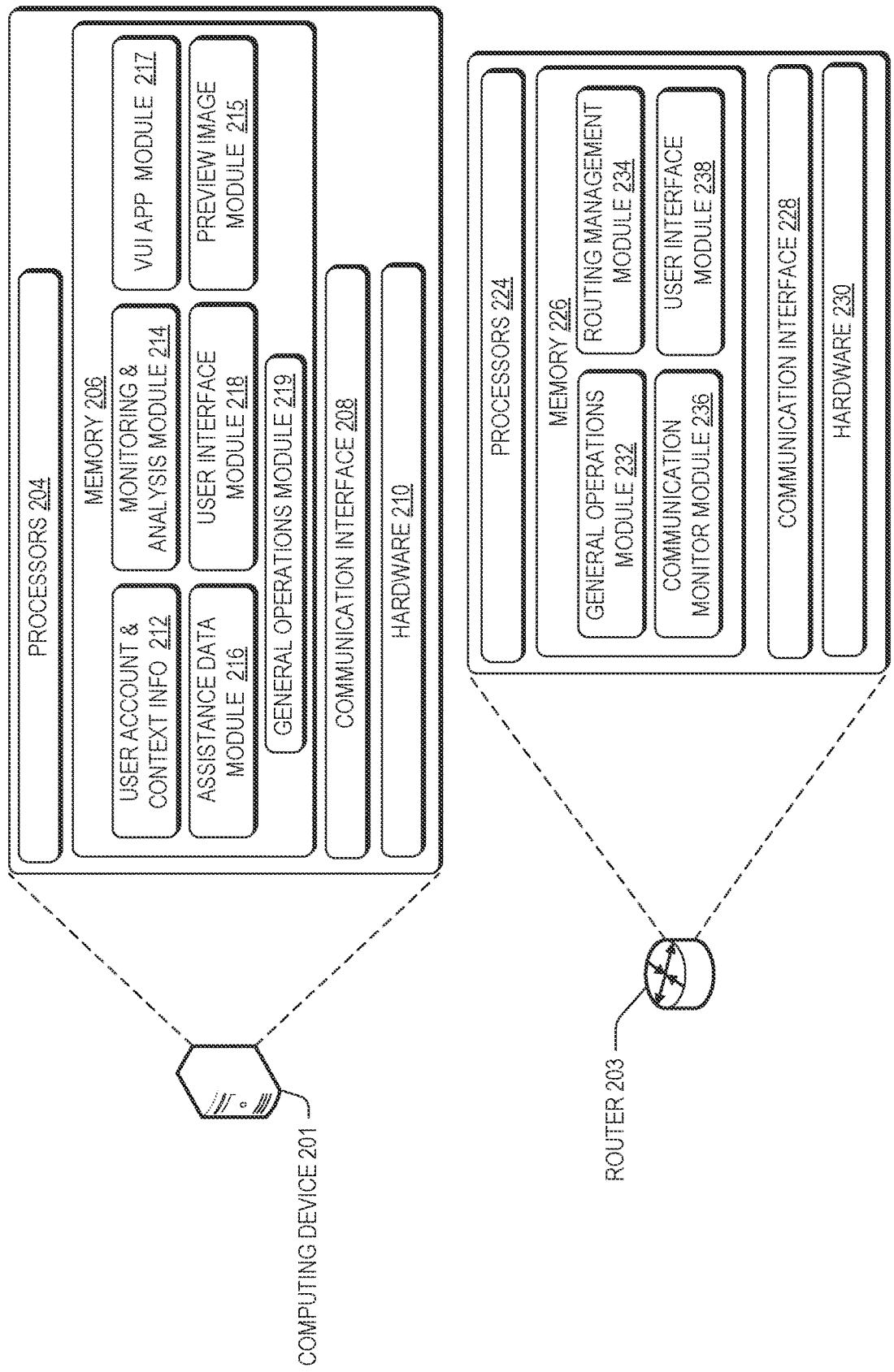
FIG. 2 shows illustrative details for various servers and other devices to implement different aspects of the architecture shown in FIG. 1.

FIG. 2 shows illustrative details of a computing device 201 and a router 203 that can support, or be variously implemented as, the system components and functions shown in FIG. 1 and/or functions described herein with respect to various embodiments and scenarios.

Figure 3:
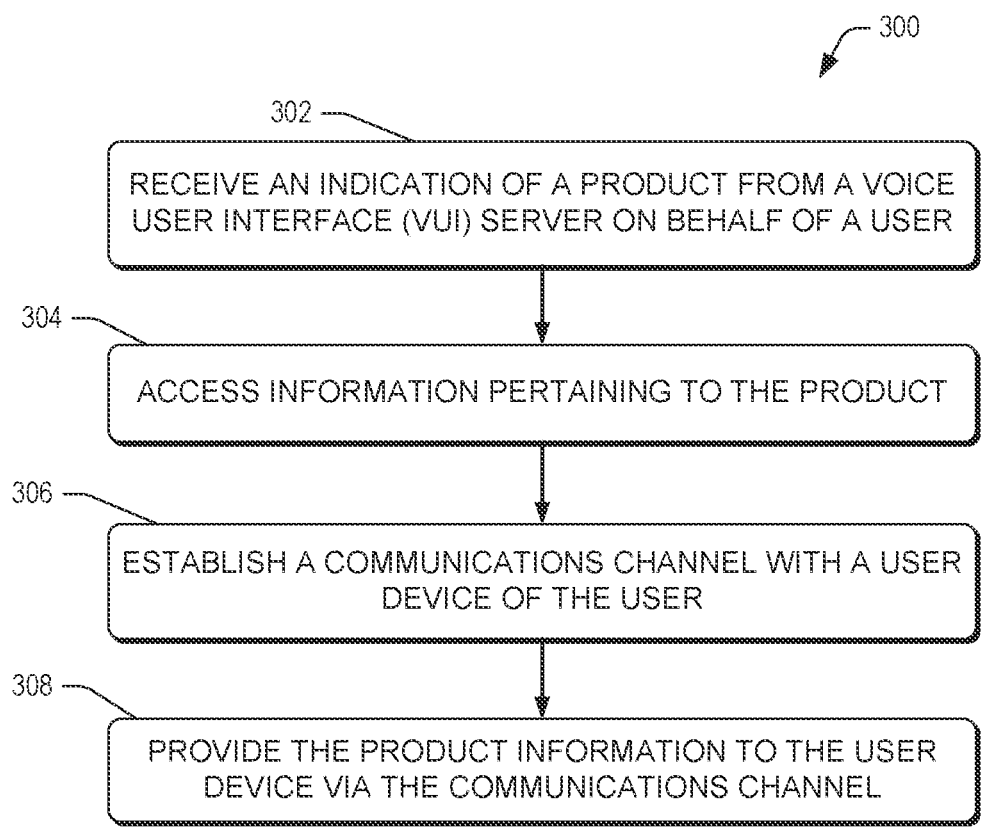
FIG. 3 is a flow diagram of an illustrative process for implementing techniques that enhance a user's VUI experience via external communications.

One or more instances of the computing device 201 can, for example, form a basis for the user devices 116, 118, 120 as well as for other equipment and functions of the wireless telecommunications service provider network 102 including for example the servers 108, 110 as well as various functions described with respect to the process of FIG. 3. Instances of the computing device 201 can, for example, be found within the VUI service provider 124, third-party HTTP website 126, third-party HTTP website 128 and/or the Internet 122, and support their various respective functions. Instances of the computing device 201 can also support various functions within the wireless network 102. The computing device 201 includes processors 204, hardware 210, and a communication interface 208. The computing device 201 also has a memory 206 that includes (but is not limited to) the various software modules shown. An assistance data module 216 can facilitate functions of the assistance server 108 such as tracking or keeping a list of known sources of information for objects both within and without the wireless telecommunications service provider network 102, and in example embodiments identifying sources of information for objects. The user account and context information module 212 can contain information about one or more user accounts with a telecommunications service provider as well as for user accounts with third party entities, from either a client perspective (e.g., information on a user equipment owned or controlled by the user) or from a server/service provider perspective (e.g., information about the user and their account that is resident on, or accessible to, a telecommunications service provider with which the user has a service subscription or a third party entity providing services to the user). The module 212 can also track status and availability of user devices in the network 102, for example that can be placed in communication with the assistance server 108 to convey images and additional object or product data to the user. The monitoring and analysis module 214 can support communication monitoring and analysis functions of the servers 108, 110 to support functions of the telecommunications service provider network 102 as described herein, for example to support establishment of the communications channels 132, 134, 136, 138, 140 and support functions of the modules 212, 216, as well as monitoring and analysis functions in the user devices 116, 118, 120 that can interact with the communication interface 208. The general operations module 219 can support different functions of various applications running on the computing device 201 including tasks delegated from other devices or services. The user interface module 218 can provide user interface functions and capability for the user devices 116, 118, 120 as well as for the servers 108, 110 and other servers in the network 102 that are not shown in FIG. 1, to enable users and administrators or technicians to access and operate the user equipment and servers. The VUI app module 217 can, for example, support VUI implementations on the user devices 116, 118, 120 and communications with the VUI service provider 124. The preview image module 215 can support operations of the assistance server 108 with respect to processing and sending images and can support operations on the user devices 116, 118, 120 to receive and display the images.

One or more instances of the router 203 can be variously located within and support routing functions within the telecommunications service provider network 102, and optionally also can be variously located within, and support routing functions of, the VUI service provider 124 and the Internet 122. The router 203 includes processors 224, a communication interface 228, hardware 230, and a memory 226 that contains various software modules including a routing management module 234 that supports various routing functions of the router 203. A communication monitor module 236 can support monitoring of communications between the router 203 and other entities, for example, servers 108, 110 within the network 102, the Internet 122, and indirectly, the VUI service provider 124 and the third-party HTTP websites 126 128, to support analysis and management functions performed by the servers 108, 110 or other elements of the telecommunications service provider or wireless telecommunications service provider network 102 with respect to the services and communications described herein. Also included are a user interface module 238 to facilitate direct communications with a human operator if needed, and a general operations module 232 that can enable the router 203 to accept and accomplish various tasks for the system or subsystem to which it more particularly belongs.

The memories 206, 226 optionally include computer-readable storage media. Computer-readable storage media can include or encompass volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk—read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave.

FIG. 3 illustrates a process that encompasses embodiments and scenarios variously described herein. In a first block 302, an indication is received, for example by the assistance server 108, from a VUI service provider such as the provider 124 or from a voice user interface server such as a server within the VUI service provider 124, indicating an object or product for which a user would like to receive information such as images and/or additional information via a second communications channel. The indication can also include any specific instructions from the user regarding user devices, the information, and/or information delivery methods or mechanisms, as variously described herein with respect to different embodiments. From block 302 the process moves to block 302, where the information is accessed and collected, for example by the assistance server 108 in accordance with various embodiments described herein. From block 304 the process proceeds to block 306 where a communication channel is established with a device of the user, for example, the second communications channel 134 and the user device 116, and/or the user devices 118, 120 and communications channels 138, 140 in accordance with various embodiments described herein. From block 306 the process proceeds to block 308, where the information accessed in block 304 is provided to the user device, for example, one or more of the user devices 116, 118, 120 shown in FIG. 1, in accordance with various embodiments described herein, for presentation to the user.

All or some of the operations and functions variously described herein with respect to example embodiments and scenarios and the process shown in FIG. 3 can be variously re-ordered, performed sequentially or in parallel, combined, or iteratively repeated. For example, the blocks shown in FIG. 3 can be performed simultaneously for different images and object or product information to in effect form a pipeline, for example so that while an action is performed in one block for an image, an action is simultaneously performed in a prior block for a next image. In addition, in example embodiments block 306 can be performed before blocks 302, 304. In example embodiments blocks 302, 304 can be performed iteratively and repeatedly before blocks 306, 308.

Various embodiments provide technical advantages that enable greater service and functionality to be provided to users with greater efficiency and lower resource cost. For example, providing additional product information or images via a second channel can conserve bandwidth on the VUI channel and computational resources of the VUI service provider and enable the information to be provided efficiently and cost-effectively on the second channel while providing an enhanced experience for the user who can easily access and view the additional information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network device, comprising:
   at least one processor;
   a network interface;
   a storage device coupled to the at least one processor; and
   software instructions stored in the storage device, wherein execution of the software instructions by the at least one processor configures the network device as a server to perform:
      receiving an indication of a product from a Voice User Interface (VUI) server, wherein the VUI server receives the indication of the product from a first user device via a first communications channel provided by the network device;
      receiving a designation of a second user device to receive at least one image of the indicated product via a second communications channel, the designation being based on a previously established permission for the second user device to receive product information based on product indications from the first user device;
      accessing the at least one image of the indicated product;
      establishing the second communications channel between the network device and the second user device in accordance with an eligibility of a user of the first user device; and
      providing, in accordance with the eligibility, the at least one image of the indicated product to the second user device via the second communications channel for display to the user.

2. The network device of claim 1, wherein the accessing comprises contacting a third-party source containing information about the indicated product.

3. The network device of claim 1, wherein the at least one processor configures the network device as a server to further perform:
   receiving a designation of a third user device to receive information of the indicated product via a third communications channel, the designation being based on a previously established permission for the third user device to receive product information based on product indications from the first user device,
   wherein execution of the software instructions by the at least one processor configures the network device to perform:
      establishing the third communications channel with the third user device; and
      providing the information to the third user device via the third communications channel.

4. The network device of claim 1, wherein the second user device comprises a television.

5. The network device of claim 1, wherein the second communications channel conveys the at least one image of the product to the second user device via at least one email.

6. The network device of claim 1, wherein the second communications channel conveys the at least one image of the product to the second user device via a Short Message Service (SMS) message.

7. The network device of claim 1, wherein the receiving, accessing, establishing and providing are performed by a single entity.

8. A method for providing product information to a user of a first user device, comprising:
   receiving an indication of a product from a Voice User Interface (VUI) server, wherein the VUI server receives the indication of the product from the first user device via a first communications channel;
   receiving a designation of a second user device to receive at least one image of the indicated product via a second communications channel, the designation being based on a permission previously established for the second user device to receive the at least one image of the product based on the product indication from the first user device;
   accessing the at least one image of the indicated product;
   establishing the second communications channel, via which to provide the at least one image of the indicated product to the second user device, in accordance with an eligibility of the user of the first user device; and
   providing, in accordance with the eligibility, the at least one image of the indicated product to the second user device via the second communications channel for display to the user.

9. The method of claim 8, wherein the accessing comprises contacting a third-party source containing information about the indicated product.

10. The method of claim 8, further comprising:
    receiving a designation of a third user device to receive information of the indicated product via a third communications channel, the designation being based on a permission established according to the eligibility of the user, for the third user device to receive product information based on product indications from the first user device;
    establishing the third communications channel with the third user device; and
    providing the information to the third user device via the third communications channel.

11. The method of claim 8, wherein the second user device comprises a television.

12. The method of claim 8, wherein the second communications channel conveys the at least one image of the product to the second user device via at least one email.

13. The method of claim 8, wherein the second communications channel conveys the at least one image of the product to the second user device via a Short Message Service (SMS) message.

14. The method of claim 8, wherein the receiving, accessing, establishing and providing are performed by a single entity.

15. A computer readable storage medium comprising instructions that, when executed by at least one processor, cause the processor to perform operations that comprise:
    receiving an indication of a product from a Voice User Interface (VUI) server, wherein the VUI server receives the indication of the product from a first user device via a first communications channel;
    receiving a designation of a second user device to receive product information pertaining to the indicated product via a second communications channel, the designation being based on a previously established permission for the second user device to receive product information based on product indications from the first user device;
    accessing the product information pertaining to the indicated product, wherein the accessing comprises contacting a third-party source of information about the indicated product;

establishing a second communications channel, via which to provide the product information pertaining to the indicated product to the second user device, in accordance with an eligibility of a user of the first user device; and providing, in accordance with the eligibility, the product information pertaining to the indicated product to the second user device via the second communications channel for presentation to the user.

16. The computer readable storage medium of claim 15, wherein the accessing comprises contacting a third-party source containing information about the indicated product.

17. The computer readable storage medium of claim 15, wherein the operations further comprise:

receiving a designation of a third user device to receive the product information pertaining to the indicated product via a third communications channel;

establishing the third communications channel with the third user device; and providing the product information pertaining to the indicated product to the third user device via the third communications channel for presentation via the third user device.

18. The computer readable storage medium of claim 15, wherein the receiving, accessing, establishing and providing are performed by a single entity.

19. The computer readable storage medium of claim 15, wherein the second communications channel conveys the at least one image of the product to the second user device via at least one email.

20. The computer readable storage medium of claim 15, wherein the second communications channel conveys the at least one image of the product to the second user device via a Short Message Service (SMS) message.

\* \* \* \* \*